United States Patent [19]
Borninski et al.

[11] Patent Number: 5,544,914
[45] Date of Patent: Aug. 13, 1996

[54] AIR BAG DISABLER CONTROL CIRCUIT

[75] Inventors: Thomas E. Borninski, Canton; Colm P. Boran, Novi; Paul Simmons, Chesterfield; Matt A. Niesluchowski, Troy, all of Mich.

[73] Assignee: Ford Motor Company, Dearborn, Mich.

[21] Appl. No.: 456,275

[22] Filed: Dec. 27, 1994

[51] Int. Cl.⁶ .................................................. B60R 21/32
[52] U.S. Cl. ........................... 280/735; 180/282; 307/10.1
[58] Field of Search ........................... 280/735; 180/274, 180/282, 271, 287; 307/10.1; 340/436, 438, 440, 669

[56] References Cited

U.S. PATENT DOCUMENTS

| | | | |
|---|---|---|---|
| 3,668,627 | 6/1972 | Brainerd | 280/735 |
| 3,794,136 | 2/1974 | Okada | 180/274 |
| 3,863,208 | 1/1975 | Balban | 280/735 |
| 3,887,819 | 6/1975 | Kurasawa | 180/282 |
| 3,980,318 | 9/1976 | Balban | 180/274 |
| 3,992,028 | 11/1976 | Abe et al. | 280/728.1 |
| 4,243,971 | 1/1981 | Suchowerskyj et al. | 340/436 |
| 4,695,075 | 9/1987 | Kamiji et al. | 280/735 |
| 4,834,420 | 5/1989 | Sankrithi et al. | 280/728.1 |
| 4,938,504 | 7/1990 | Fukuda et al. | 280/735 |
| 4,956,631 | 9/1990 | Itoh | 280/735 |
| 5,172,790 | 12/1992 | Ishikawa et al. | 180/268 |
| 5,232,243 | 8/1993 | Blackburn et al. | 280/732 |
| 5,324,074 | 6/1994 | Christian et al. | 280/728.1 |
| 5,326,133 | 7/1994 | Breed et al. | 280/735 |
| 5,330,226 | 7/1994 | Gentry et al. | 280/735 |
| 5,409,258 | 4/1995 | Kawabata | 280/735 |

*Primary Examiner*—Paul N. Dickson
*Attorney, Agent, or Firm*—Daniel M. Stock

[57] ABSTRACT

A control circuit (46) for an air bag disabling system (16,22) includes a resistive test load (66) arranged in parallel with the resistive elements of the air bag (48) and in some embodiments includes a fuse (64) in series with the resistive test load (66), the resistive test load providing for the operation of the vehicle air bag system independent of the disabling effected by the disabling system and the fuse providing indication of operation of the air bag disabling system.

10 Claims, 3 Drawing Sheets

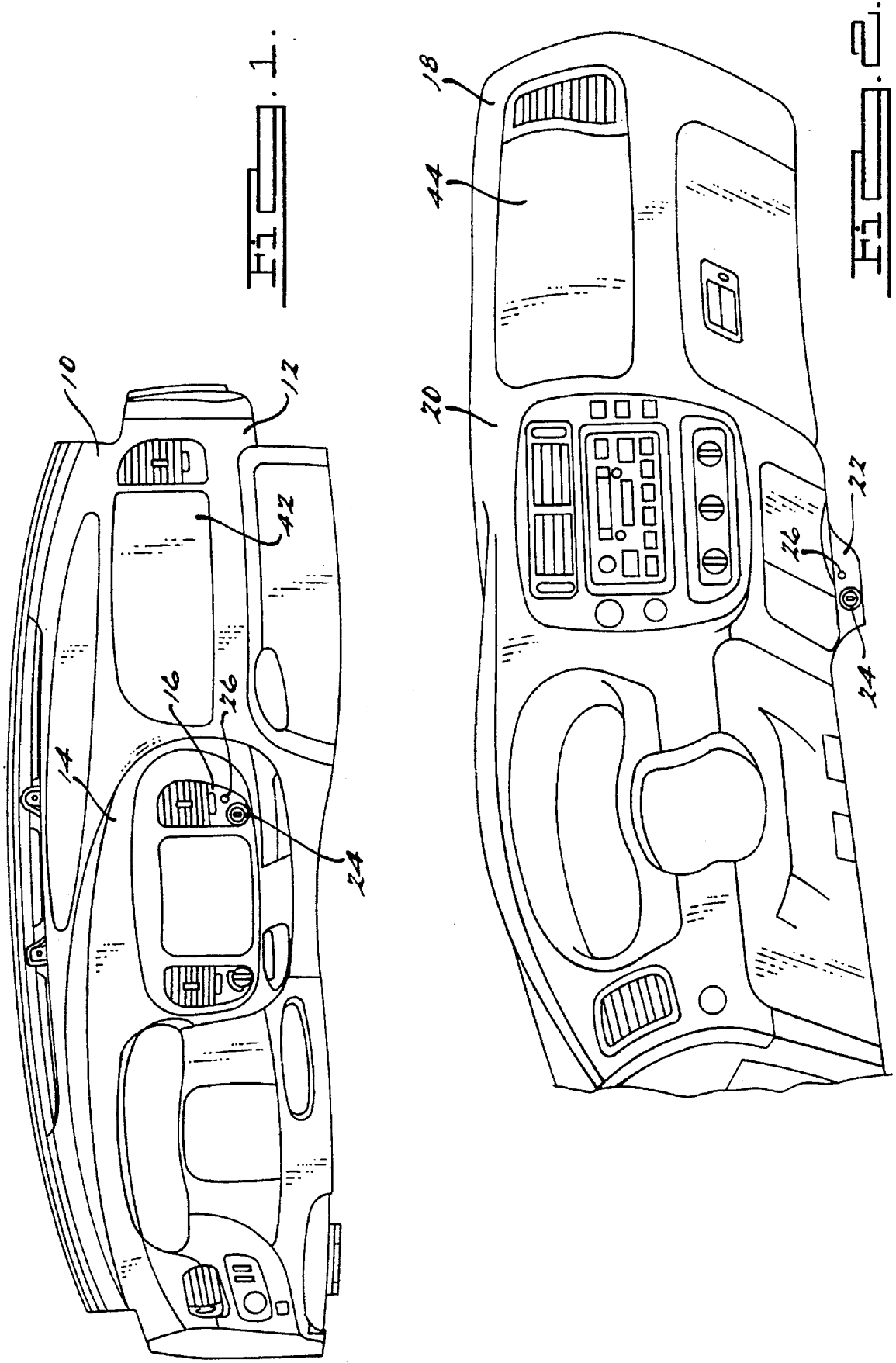

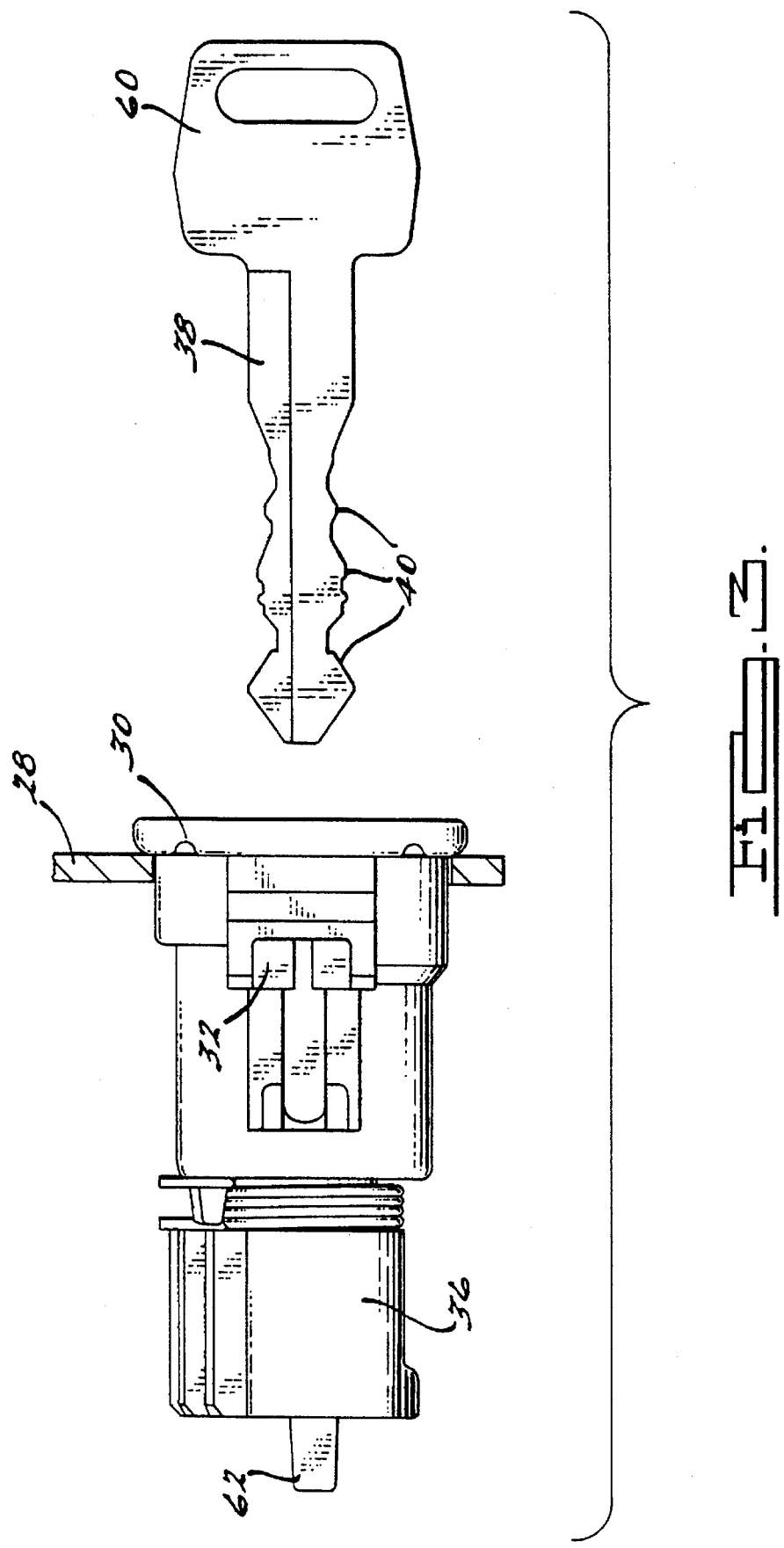

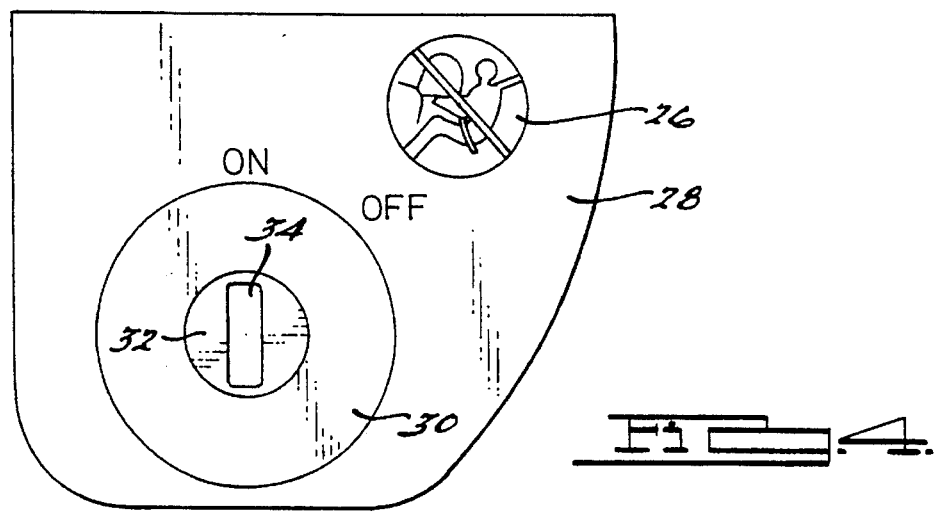
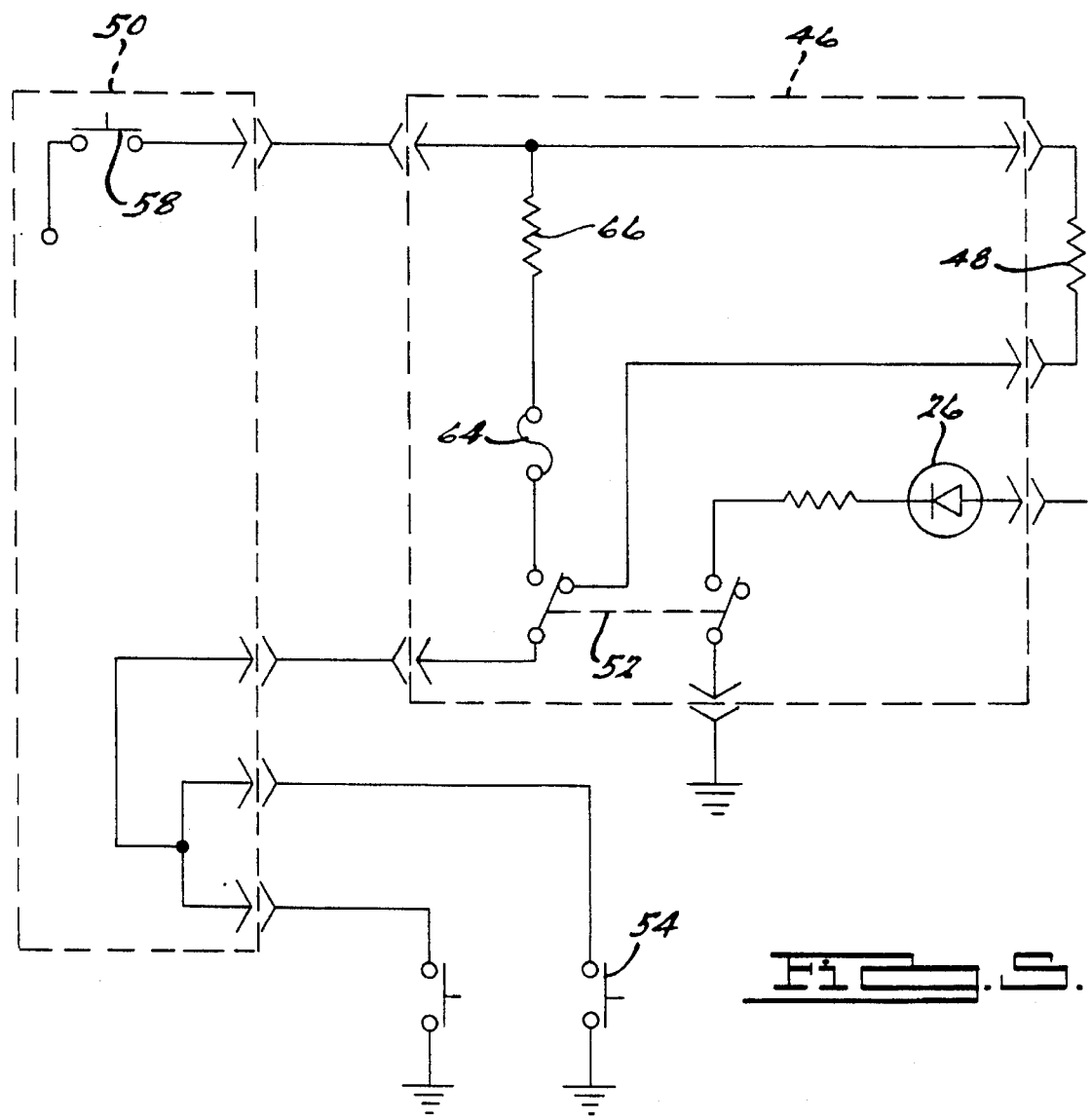

5,544,914

AIR BAG DISABLER CONTROL CIRCUIT

BACKGROUND OF THE INVENTION

1. Field of the Invention

The present invention relates generally to automotive vehicle occupant restraint systems, particularly air bags. It relates more specifically to mechanisms for disabling such systems selectively.

2. Description of the Related Art

Since inflatable occupant restraint systems or air bag systems have come into widespread use in the automotive industry, it has been observed that there are certain instances in which it may be desirable to disable operation of the air bag system in a vehicle during the period in which the vehicle is in use. Exemplary of such instances is that present when a vehicle has air bags for both the driver and passenger positions and a rear facing infant seat is placed in the passenger position and is not properly positioned for use with the air bag. Since practically all air bag systems presently in use are activated by transmitting an electrical signal powered by the vehicle electrical system to an igniting device in the air bag system, it has been suggested to provide switching to effect disabling of the air bag system on a selective basis. U.S. Pat. Nos. 5,324,074; 5,234,228; and 5,161,820 are exemplary of such approaches.

Certain disadvantages, however, are noted in the prior art disabling systems. These disadvantages arise from the appropriate desire of the designer of the occupant restraint system to ensure that because of the inherent normal benefit of having the air bag system operating, the disabling takes place only when intended and only under the control of the operator of the vehicle. It is also desired that the reliability and efficacy of this disabling device be monitored during a vehicle operating event which might normally give rise to operation of the air bag disabled by the disabling system. None of the prior art devices provide such advantages.

In response to the disadvantages of the prior art disabling systems, the present invention provides an air bag disabling system for use in automotive vehicles having an air bag mounted in the instrument panel of the vehicle and electrically connected to the electrical power system of the vehicle for activation response to a condition sensed by an acceleration sensor mounted in the vehicle which includes a switch electrically connected to the vehicle power source into the air bag and selectively movable between a first position interconnecting the source of electrical power and the air bag to enable activation of the air bag and a second position providing such activation, and a resistive test load substantially equivalent to the resistive load of the air bag connected in parallel with the air bag in series with the switch.

According to one feature of the present invention, a fuse is connected in series between the resistive test load and the switch configured to break connection upon sensing a level of current through the switch equal to that required to activate the air bag.

BRIEF DESCRIPTION OF THE DRAWINGS

Other objects, features, and advantages of the present invention will be apparent to those skilled in the automotive vehicle occupant restraint arts upon reading the following description with reference to the accompanying drawings, in which:

FIG. 1 is an elevation view of an automotive instrument panel illustrating installation of an air bag disabling system according to the present invention;

FIG. 2 is a view similar to FIG. 1 illustrating an alternative embodiment for installation of the air bag disabling system;

FIG. 3 is an exploded view of the key and key cylinder of the invention air bag disabling system;

FIG. 4 is an enlarged elevation view of the exterior surfaces of the air bag disabling system presented to the outside of the instrument panel; and FIG. 5 is an electrical schematic of the air bag disabling system according to the present invention.

DESCRIPTION OF THE PREFERRED EMBODIMENT(S)

Turning now to FIGS. 1 and 2, an instrument panel 10 of an automotive vehicle is illustrated as including a main body portion 12 having a center section 14 in which is mounted an air bag disabling system 16 according to the present invention. The embodiments of FIG. 1 and 2 differ in that the instrument panel 10 of the FIG. 1 embodiment includes the air bag disabling system module 16 mounted directly into the main body portion 12. On the other hand, the FIG. 2 embodiment illustrates an instrument panel 18 having a main body portion 20 and an air bag disabling system module 22 is positioned to suspend below the main body portion 20.

Common to both the modules 16 and 22 are a key cylinder 24 and a signal light 26 whose arrangement can best be seen in FIG. 3. In each of the modules 16, 22, a housing 28 is inserted into and is mounted in the instrument panel main body portion 12, 20. As can best be seen in FIG. 3, the key cylinder presents a bezel portion 30 outwardly of the instrument panel 10, 12 and the bezel portion 30 is fixedly mounted against the housing 28; and as may best be seen in FIG. 4, and a key cylinder assembly 32 is rotatably mounted within the bezel 30, presenting a key slot 34 externally of the instrument panel 10, 12. The key cylinder 32 and bezel 30 may be of substantially conventional designs, which will typically include an actuating portion 36 rotatably movable upon insertion of a key 38 into the key slot 34 and rotation thereof in known lock and key manner. The key 38 is preferably of conventional design having a plurality of bits 40 for engagement with actuating pins or other similar mechanisms within the key cylinder 32 to effect rotation of the actuating portion 36. It is, of course, well known to form such keys and to use such keys for ignition keys in automotive vehicles. It is preferred in the disabling system module of the present invention that the lock cylinder 32 be configured to operatively engage with certain of the bits 40 which are common to all keys of a particular automotive vehicle manufacturer. Alternatively, the key cylinder 32 can be configured in a known manner to accept a key 38 only identical in configuration to that required for the ignition key of the vehicle in which the disabling system module 16, 22 is installed.

The key 38, upon insertion into the key slot 34, permits movement between the first position labeled "ON" in FIG. 3 and the second position labeled "OFF", displaced therefrom in a clockwise direction. The ON position corresponds to a position in which an air bag system may be activated. The OFF position corresponds to a position in which the air bag system may not be activated. It will be noted that the key slot 34 aligns with the signal light 26 when in the OFF position, and as will be later described, the signal light is lit when it is in a position to give an indication that the air bag system is disabled.

It is contemplated that the disabling system modules 16, 22 are best utilized in automotive vehicles that have air bag systems installed in at least two seating positions in the front seat of a vehicle in juxtaposition with an instrument panel such as the instrument panels 10, 18. Returning to FIG. 1, it is to be understood that air bags would be installed in the vehicle steering wheels (not shown) on the left side of the instrument panel 10, 18, and in the passenger positions 42, 44 on the right side of the instrument panels 10, 18, respectively. When the passenger seat juxtaposed the air bags 42, 44 is unoccupied or is occupied by persons or things for which operation of the air bag system is not desired, the disabling systems 16, 22 may be actuated by turning the key 40 to the OFF position shown. One exemplary use is the disabling of the air bag system in situations in which an infant in a rear facing seat is placed in the passenger position. For some configurations of seat and air bag, it may be undesirable to permit air bag activation during emergency situations.

The key cylinder 32 is operatively connected in a mechanical fashion to a circuit indicated at 46 in FIG. 5 for electrically interconnecting the passenger air bag 42, 44 indicated diagrammatically as a resistive load 48 and a source of electrical power 50 in the vehicle. During normal operation of a vehicle, a switch 52, in the position shown in FIG. 5, operates to conduct power from the vehicle electrical power source 50 to the air bag 48 when either of a pair of primary sensors 54, 56 and an auxiliary safing sensor 58 are closed. The sensors 54, 56, 58 are acceleration sensors mounted in the vehicle to sense decelerations representative of collision effected decelerations above a certain magnitude.

It is also known to apply low power to the air bag 48 to test the integrity of the air bag systems 42, 44. The circuit diagnosis effected during such operation makes use of the resistance of certain of air bag electrical components, as represented diagrammatically at 48.

Upon rotating the key 38 from the ON position to the OFF position, the key 38, which includes a flat sided handle portion 60, aligns to point at the signal lamp 26. The actuator portion 36 of the key cylinder 32 includes an operating tab 62 which interacts with the switch 52 to move it from the position shown in FIG. 5 to its alternative position in which electrical power from the vehicle electrical system 50 is supplied to the signal lamp 26 and through a fuse 64 and a resistive test load 66 arranged in parallel with the air bag 48 and connection is broken between the power source 50 and air bag 48. The resistive test load 66 simulates the air bag 48 and permits continuing operation of diagnostics at low power. Upon sensing through operation of the sensors 54, 56, 58 that a collision condition has occurred, however, higher power is delivered through the circuit in the OFF position. Advantageously, the fuse 64 is sized to disconnect upon application of power at the level that the air bag system utilized to activate the air bag 48. The controlling of the two power levels as a function of the diagnostic and firing circuit of the automotive vehicle is not part of the present invention. It should be understood, however, that the diagnostic operation typically takes place under influence of a current of about 150 milliamp while the firing operation is effected through passing a current of approximately 5 amps in the preferred air bag system. As a check on the reliability of the disabling system module 16, 22, the fuse 64 acts as a memory so that if a collision has occurred which effects closure of sensors 54 or 56 and 58, the fuse will operate to open the circuit, and it can be readily detected that the switch 52 was in the OFF position during the event.

While only certain embodiments of the disabling system of the present invention have been described, others may be possible without departing from the scope of the following claims.

What is claimed is:

1. A control circuit for an air bag disabling system for an automotive vehicle having an ignition key cylinder and having an air bag mounted in an instrument panel in the vehicle and activated to inflate a cushioning bag in response to a condition sensed by an acceleration sensor operatively carried with the vehicle, the disabling system control circuit comprising:

a source of electrical power mounted in the vehicle;

a switch electrically connected to said source of electrical power and to the air bag assembly and selectively movable between a first position interconnecting said source of electrical power and the air bag to enable activation of the air bag assembly and a second position preventing said activation; and a resistive test load substantially equivalent to the resistive load of the air bag assembly connected electrically in parallel with said air bag and wherein in said first position said switch is electrically disconnected from said resistive test load.

2. A control circuit as defined in claim 1, wherein in said first position said switch is electrically electrically interconnected said source of electrical power and said resistive test load.

3. A control circuit as defined in claim 1, wherein in said second position said switch is electrically connected to said sourwe of electrical power and said resistive test load.

4. A control circuit as defined in claim 1, and further comprising a fuse electrically connected in series between said switch and said resistive test load.

5. A control circuit as defined in claim 4, wherein said fuse is operative to effect disconnection between said switch and said resistive test load.

6. A control circuit as defined in claim 1, and further comprising a signal light operatively connected to said switch and wherein movement of said switch to said second position electrically interconnects said source of electric power in both said signal light and said resistive test load.

7. A control circuit as defined in claim 3, and further comprising a fuse electrically connected in series between said switch and said resistive test load.

8. A control circuit as defined in claim 7, wherein said fuse is operative to effect disconnection between said switch and said resistive test load.

9. A control circuit for an air bag disabling system for an automotive vehicle having an ignition key cylinder operated by an ignition key having a plurality of bits and having an air bag assembly mounted in an instrument panel in the vehicle and activated to inflate a cushioning bag in response to a condition sensed by an acceleration sensor operatively carried with the vehicle, the control circuit comprising:

a source of electrical power mounted in the vehicle;

a switch electrically connected to said source of electrical power and to the air bag assembly and selectively movable between a first position interconnecting said source of electrical power and the air bag assembly to enable activation of the air bag assembly and a second position preventing said activation;

a resistive test load substantially equivalent to the resistive load of the air bag connected electrically and parallel with said air bag;

a fuse electrically connected in series between said switch and said resistive test load and wherein said fuse is operative to effect disconnection between said switch and said resistive test load.

10. A control circuit as defined in claim 9, and further comprising a signal light operatively connected to said switch and wherein movement of said switch to said second position electrically interconnects said source of electrical power in both said signal light and said resistive test load.

* * * * *